United States Patent Office 2,979,367
Patented Apr. 11, 1961

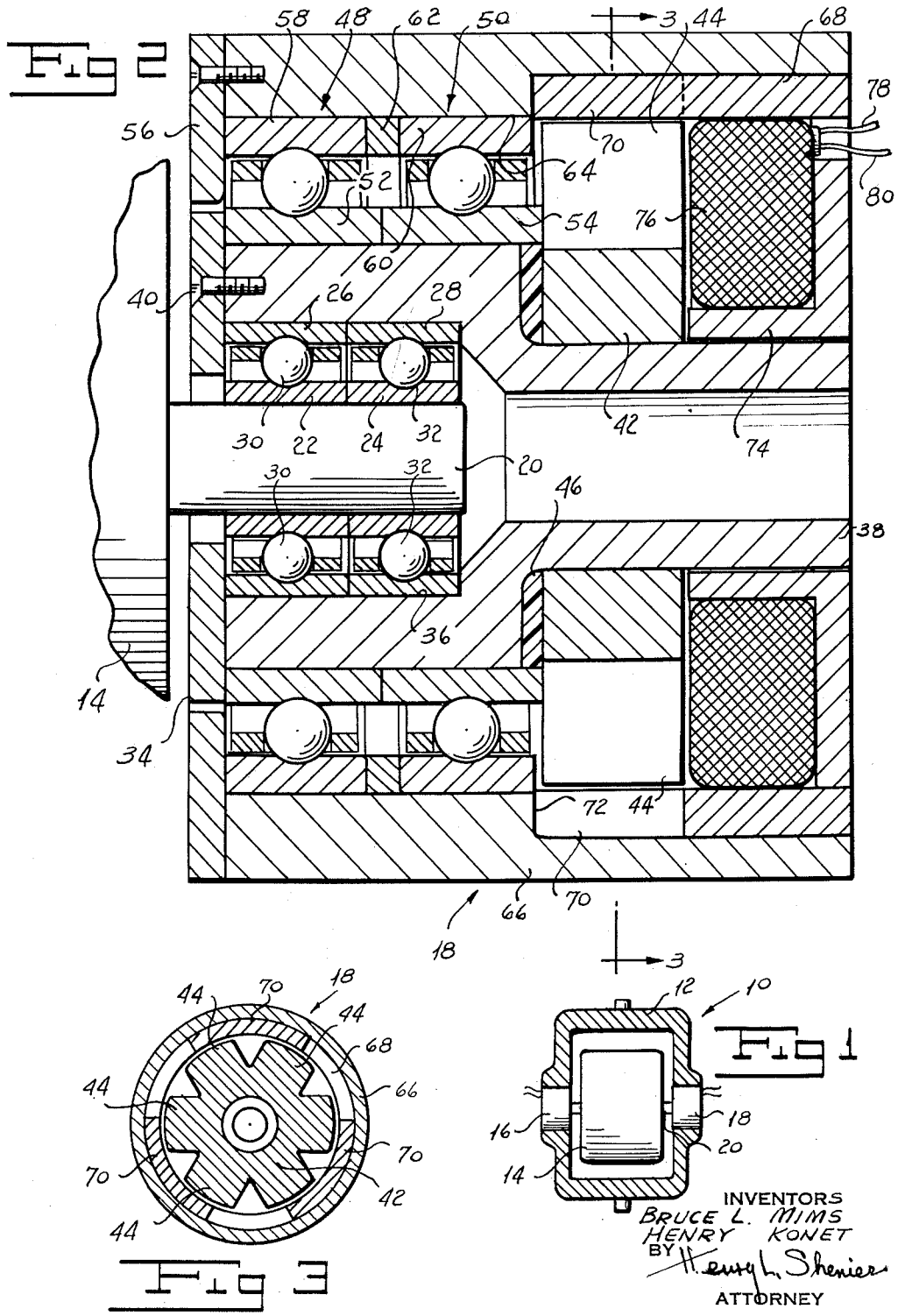

2,979,367

DYNAMIC BEARING

Bruce L. Mims, Danbury, Conn., and Henry Konet, Hohokus, N.J., assignors to The Barden Corporation, Danbury, Conn., a corporation of Connecticut Filed Feb. 10, 1958, Ser. No. 714,318

4 Claims. (Cl. 308—183)

Our invention relates to a dynamic bearing and more particularly to an improved dynamic bearing which is manufactured as a simple self-contained unit and which has improved means for oscillating the bearing.

In the operation of bearings in the prior art both Coulomb friction and viscous friction must be overcome in order to produce rotation of the supported member such as a shaft or the like. Viscous friction is resistance to motion resulting from windage, lubricant drag, and other similar viscous effects. In order to overcome Coulomb friction, which is that frictional resistance to rotation other than that which is the result of viscous effects, sufficient force must be applied to the supported member to set it in motion and to maintain it in motion.

Precision bearings are required in the prior art for use in installations such as gyroscope gimbals, stable platforms, scales, synchronous systems, static balancing equipment and the like. In such low friction and low speed installations Coulomb friction plays a very important part in determining the torque which must be applied between the shaft and its support to produce the desired movement of the shaft. Viscosity friction at the low speeds used in these installations are small and have little effect on the torque required to produce motion. It is desirable in equipment of the nature described above that the applied torque be as low as is possible to achieve the required result.

In order to overcome the effect of Coulomb friction in some bearings of the prior art one or the other of the bearing rings is continuously rotated or is oscillated. All of these bearings employ mechanical linkages for connecting a drive motor to the bearing to be oscillated. Their nature is such that the bearing cannot be made as a simple, compact and self-contained unit. These external mechanical drives and connecting linkages are not satisfactory for use in bearing installations such as gyroscope gimbals and the like in which size, weight and reliability of the bearings are paramount considerations.

We have invented a dynamic bearing unit which may readily be constructed as a compact, self-contained unit. It employs a simple electromagnetic drive for oscillating the bearing to overcome the effect of Coulomb friction. Our drive is simpler and less complicated than are the mechanical drives of the prior art. Our dynamic bearing and its drive may readily be constructed as a light, compact unit which is readily installed in a gyroscope gimbal or the like. Our bearing is very reliable in use since its ring drive is not subject to mechanical failure which may occur in the ring drives of bearings of the prior art. Substantially the only frictional resistance to motion in our bearing results from viscosity effects.

One object of our invention is to provide a dynamic bearing which may readily be constructed as a compact and self-contained unit.

A further object of our invention is to provide a dynamic bearing which may readily be installed.

Still another object of our invention is to provide a dynamic bearing having a simple and more reliable drive than dynamic bearings of the prior art.

A further object of our invention is to provide a dynamic bearing having a simple electromagnetic drive.

Other and further objects of our invention will appear from the following description.

In general, our invention contemplates the provision of a dynamic bearing including a support rotatably mounted in the bearing housing. We mount a movable bearing carrying the element to be supported on the support for rotation with the support. We provide a simple electromagnetic drive for oscillating the movable bearing. Our bearing may readily be installed by mounting the housing on the supporting member and by securing one element of the movable bearing to the element to be supported. Preferably, we oscillate the rotatably supported bearing element with the result that the effect of Coulomb friction in the bearing is substantially eliminated.

In the accompanying drawings which form part of the instant specification and which are to be read in conjunction therewith and in which like reference numerals are used to indicate like parts in the various views:

Figure 1 is a sectional view of a gyroscope rotor supported in a housing on our dynamic bearings.

Figure 2 is a sectional view of our dynamic bearing.

Figure 3 is a sectional view of our dynamic bearing taken along the line 3—3 of Figure 2 and drawn on a greatly reduced scale.

Referring now more particularly to the drawings, one installation in which our dynamic bearing may effectively be employed is a gyroscope indicated generally by the reference character 10 having a housing 12 and a gyroscope rotor 14. Respective dynamic bearings 16 and 18 rotatably support the rotor shaft 20 of the gyroscope 10.

Since both bearings 16 and 18 are substantially identical, we will for purposes of simplicity describe only the bearing 18, indicated generally in Figures 2 and 3.

In the form of our invention shown, bearing 18 is a duplex bearing including respective inner races 22 and 24 and outer races 26 and 28. We dispose respective sets of balls 30 and 32 between the pairs of races 22 and 26 and 24 and 28. An annular plate 34 retains the races 26 and 28 in a recess 36 formed in a magnet support 38 to hold the bearings in position with respect to support 38. Any convenient means known to the art such as screws 40 may be employed to secure the plate 34 to the support 38. We assemble the inner races 22 and 24 on shaft 20 for rotation with the shaft by any convenient means such, for example, as by a press fit.

We assemble a rotor comprising a permanent magnet 42 having any suitable number of poles 44 such, for example, as six poles on support 38 by means of cement or the like 46. Respective bearings indicated generally by the reference characters 48 and 50 have inner races 52 and 54 carried by support 38. An annular plate 56 holds the outer races 58 and 60, separated by a spacer ring 62, within a bore 64 formed in a housing 66 carried by the bearing housing 12. We employ the bearings 48 and 50 to mount the support 38 for rotary movement with respect to housing 66. The housing 66 forms what can be considered to be a stationary support for the bearings and the movable support 38 carried thereby.

We mount a stator comprising a spool 68 having a number of axially extending poles 70 such, for example, as three poles within the bore 64 of housing 66 with the poles 70 in engagement with a shoulder 72 formed in the bore 64. The inner cylindrical boss 74 of spool 68 carries a circular coil 76 adapted to be supplied with electrical energy by respective conductors 78 and 80.

From the foregoing it will be seen that the bearing including balls 30 and 32 rotatably supports shaft 20 for movement with respect to support 38 and for movement with respect to housing 66. Since both rings of the bearings including balls 30 and 32 normally move, we have termed these bearings "movable" bearings. Bearings 48 and 50 permit relative movement between support 38 and housing 66. While we have shown our bearing as a rolling bearing including balls it is to be understood that we may, if desired, use any other type bearing.

As has been explained hereinabove, when a torque is to be applied to a supported member such, for example, as shaft 20 in bearings of the prior art, a sufficient force must be applied to the shaft to overcome Coulomb friction in the supporting bearings to arrive at the desired torque. In our bearing, however, we move the outer races 26 and 28 continuously to nullify the effect of Coulomb friction in the bearing 18. When this is done, the force applied to shaft 20 to produce a given torque need only overcome viscous friction in producing the desired torque. This viscous friction is very small at low speeds. As a result, the force required to produce a given torque on the rotor 14 is very small in an installation employing our bearings.

We have shown by way of example one means for moving the outer races 26 and 28 with respect to inner races 22 and 24 to overcome Coulomb friction. Preferably, in this form of our invention we oscillate the outer bearings 26 and 28 so that the net frictional torque applied to shaft 20 is substantially zero. To accomplish this, we apply low frequency alternating current to the conductors 78 and 80 to produce an alternating magnetic field in the poles 70. During one-half cycle of the alternating current supplied to coil 76 the magnetic flux in spool 68 can be considered as emerging from the pole 70. During this half cycle the permanent south poles of the magnet 42 tend to aline themselves with the pole 70. During the reverse half cycle of the alternating current fed to coil 76 flux may be considered to be flowing into the pole 70. During this half cycle the permanent north poles of the magnet 42 tend to aline themselves with the pole 70. It will be seen that during alternate half cycles of the alternating current in coil 76 different sets of poles 44 tend to aline themselves with the pole 70 to result in an oscillation of the permanent magnet 42. As the magnet oscillates, the support 38 and the outer races 26 and 28 carried by the support also oscillate. Owing to this oscillating movement of races 26 and 28 the force required to produce a required torque on shaft 20 need not act against Coulomb friction, but only against viscous friction which is relatively low at the low velocities normally employed in such installations.

As an alternate to the drive shown, we could, if desired, use a torsion spring and supply a low frequency alternating current or a pulsating direct current to the coil 76. While we have shown outer races 26 and 28 as being oscillated, we could as well provide a system in which the inner race, rather than the outer race, was oscillated. The bearings could be of any type other than the ball bearing shown such, for example, as needle, roller, air, or other fluid bearings. Rather than oscillating the outer races, we could, if desired, merely rotate the outer races of the bearings, the inner races of which support the movable member such as the shaft 20. We prefer, however, to oscillate the outer races to ensure that the net frictional torque applied to shaft 20 is zero.

In operation of our dynamic bearing when it is used, for example, to support the rotor 14 of a gyroscope, we feed a low frequency alternating current to coil 76. During alternating half cycles of this alternating current, different sets of poles 44 of the permanent magnet 42 tend to aline themselves with the poles 70 of the spool 68. Under this action the outer races 26 and 28 of the bearing oscillate. We select the frequency of the alternating current to produce a velocity of oscillation which is greater than the angular velocity which at the shaft 20 is to be rotated.

As long as the angular velocity of shaft 20 is less than the velocity of oscillation, the losses which normally would result from Coulomb friction are supplied by the means for oscillating the outer races. The force applied to shaft 20 to produce the desired torque need not act against Coulomb friction. The only frictional resistance to motion which must be overcome by this force results from viscosity effects such as windage, lubricant drag, and the like. Preferably, the frequency of oscillation is equal to the natural resonant frequency of the magnet 42 and the arbor 38. With the outer races oscillating, the torque between the housing 12 and the shaft 20 required to produce a given torque on rotor 14 is very much less than the torque required in an installation employing the conventional bearings in the type known in the prior art.

We have provided a dynamic bearing which may be manufactured as a simple, compact and readily installed unit. Our bearing employs an extremely simple and reliable electromagnetic drive for oscillating the bearing to overcome the effect of Coulomb friction on the torque required to drive the member supported by the bearing.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A dynamic bearing including in combination a housing, a first bearing carried by the housing within said housing, a rotatable support, means mounting said support on said first bearing and within said housing, electromagnetic means comprising a permanent magnet and a winding adapted to be energized with alternating current to oscillate said magnet, means mounting said winding and said permanent magnet within said housing on said housing and on said support, a second bearing and means mounting said second bearing within said housing on said support.

2. A dynamic bearing unit including in combination a housing, a first bearing carried by the housing within said housing, a rotatable support, means mounting said support on said first bearing and within said housing, a magnetic spool having a number of poles, a winding carried by said spool, a permanent magnet having a number of poles equal to twice the number of spool poles, means mounting said spool and said magnet for relative movement within said housing on said housing and on said support, said winding being adapted to be energized with alternating current to oscillate said support, a second bearing and means mounting said second bearing within said housing on said support.

3. A dynamic bearing unit including in combination a housing, a first bearing carried by the housing within said housing, a rotatable support, means mounting said support on said first bearing and within said housing, a spool formed with a number of poles, a circular winding carried by said spool and having an axis, said spool poles extending in the direction of said axis, a permanent magnet having a number of poles equal to twice the number of spool poles, said magnet poles extending in a direction perpendicular to said axis, means mounting said spool and said magnet for relative rotation within said housing on said housing and on said support with said magnet poles adjacent said spool poles, said winding being adapted to be energized with alternating current to oscillate said support, a second bearing and means mounting said second bearing within said housing on said support.

4. A dynamic bearing unit including in combination a stationary support, a movable support, means mounting said movable support on said stationary support for movement about its axis, a movable bearing, means mounting said movable bearing on said movable support, electromagnetic means comprising a rotor and a stator adapted to be energized to oscillate said rotor, means mounting said stator on said stationary support and means mounting said rotor on said movable support for movement therewith about said movable support axis.

References Cited in the file of this patent

UNITED STATES PATENTS

| | | |
|---|---|---|
| 1,600,071 | Shaifer | Sept. 14, 1926 |
| 1,739,885 | Zbinden | Dec. 17, 1929 |
| 1,798,529 | Foley | Mar. 31, 1931 |
| 2,048,834 | Young | July 28, 1936 |
| 2,410,602 | Davis | Nov. 5, 1946 |
| 2,518,159 | Martin | Aug. 8, 1950 |
| 2,577,942 | Agins | Dec. 11, 1951 |

FOREIGN PATENTS

| | | |
|---|---|---|
| 647,002 | Great Britain | Dec. 6, 1950 |
| 650,052 | Great Britain | Feb. 14, 1951 |